(12) United States Patent
Gatewood et al.

(10) Patent No.: US 9,344,452 B2
(45) Date of Patent: May 17, 2016

(54) USER CONTROL OVER WIFI NETWORK ACCESS

(75) Inventors: John M. Gatewood, Lee's Summit, MO (US); Lee Alan Schnitzer, Lenexa, KS (US); Sharon L. Woodrum, Louisburg, KS (US); Bhanu Prakash Voruganti, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/552,749

(22) Filed: Jul. 19, 2012

(65) Prior Publication Data

US 2014/0026192 A1    Jan. 23, 2014

(51) Int. Cl.
*G06F 7/04* (2006.01)
*H04L 29/06* (2006.01)
*H04W 12/06* (2009.01)
*H04W 84/12* (2009.01)

(52) U.S. Cl.
CPC .............. *H04L 63/20* (2013.01); *H04W 12/06* (2013.01); *H04W 84/12* (2013.01)

(58) Field of Classification Search
CPC ...... H04L 63/20; H04W 12/06; H04W 84/12; G06F 12/1416; G06F 11/0766; G06F 3/0673; G06F 3/0622; G06F 11/0727; G06F 3/0653; G06F 2212/1052
USPC ............................................................ 726/4
See application file for complete search history.

(56) References Cited

U.S. PATENT DOCUMENTS

| | | |
|---|---|---|
| 6,614,774 B1 | 9/2003 | Wang |
| 6,944,167 B1 | 9/2005 | McPherson |
| 7,218,609 B2 | 5/2007 | Borella et al. |
| 7,224,673 B1 | 5/2007 | Leung et al. |
| 7,313,631 B1 | 12/2007 | Sesmun et al. |
| 7,447,182 B2 | 11/2008 | Chowdhury et al. |
| 7,510,113 B2 | 3/2009 | Igarashi et al. |
| 7,545,762 B1 | 6/2009 | McConnell et al. |

(Continued)

FOREIGN PATENT DOCUMENTS

| | | |
|---|---|---|
| EP | 1633083 | 3/2006 |
| EP | 2200223 | 6/2010 |

(Continued)

OTHER PUBLICATIONS

Junbiao Zhang, et al.; "Virtual Operator based AAA in Wireless LAN Hot Spots with Ad-hoc Networking Support;" Mobile Computing and Communications Review; Jul. 1, 2002; pp. 10-21; vol. 6, No. 3; New York, NY.

(Continued)

*Primary Examiner* — Mohammad W Reza

(57) ABSTRACT

A server system transfers display data for presentation to a user who selects multiple geographically-distributed WiFi access systems and a password. The server system receives user data that indicates the user-selected WiFi network access systems and the user-selected password. The server system stores an association between the user-selected WiFi network access systems and the user-selected password. The server system receives an access request for one of the user-selected WiFi network access systems using the user-selected password. The server system transfers a positive response to the access request based on the stored association between the user-selected WiFi network access systems and the user-selected password.

18 Claims, 10 Drawing Sheets

(56) References Cited

U.S. PATENT DOCUMENTS

| | | | |
|---|---|---|---|
| 7,636,569 | B2 | 12/2009 | Le et al. |
| 7,668,174 | B1 | 2/2010 | Patel et al. |
| 7,707,310 | B2 | 4/2010 | Thubert et al. |
| 7,958,544 | B2 | 6/2011 | Chen et al. |
| 7,962,122 | B2 | 6/2011 | Nikander et al. |
| 8,059,643 | B1 | 11/2011 | Shojayi et al. |
| 8,068,499 | B2 | 11/2011 | Vidya et al. |
| 8,457,594 | B2 * | 6/2013 | Stevens et al. ............... 455/410 |
| 2004/0052238 | A1 | 3/2004 | Borella et al. |
| 2004/0215707 | A1 | 10/2004 | Fujita et al. |
| 2004/0230446 | A1 | 11/2004 | Park et al. |
| 2005/0050180 | A1 | 3/2005 | Kim et al. |
| 2005/0054343 | A1 | 3/2005 | Nykanen et al. |
| 2005/0143065 | A1 * | 6/2005 | Pathan et al. ............. 455/432.1 |
| 2007/0081496 | A1 | 4/2007 | Karge et al. |
| 2008/0037498 | A1 | 2/2008 | Narayanan et al. |
| 2009/0003297 | A1 | 1/2009 | Xia et al. |
| 2009/0059874 | A1 * | 3/2009 | Carter ........................... 370/338 |
| 2009/0198808 | A1 * | 8/2009 | Cai et al. ...................... 709/223 |
| 2009/0199281 | A1 * | 8/2009 | Cai et al. .......................... 726/7 |
| 2010/0002668 | A1 | 1/2010 | Tan et al. |
| 2010/0100928 | A1 | 4/2010 | Gasparini et al. |
| 2010/0322123 | A1 | 12/2010 | Lee |
| 2013/0089001 | A1 * | 4/2013 | Dattagupta ................... 370/255 |
| 2013/0163442 | A1 * | 6/2013 | Livingston ................... 370/252 |
| 2013/0283358 | A1 * | 10/2013 | Manroa et al. .................... 726/5 |

FOREIGN PATENT DOCUMENTS

| | | |
|---|---|---|
| WO | 01/41401 | 6/2001 |
| WO | 2004014024 | 2/2004 |

OTHER PUBLICATIONS

U.S. Appl. No. 11/500,706, filed Aug. 8, 2006.

3rd Generation Partnership Project 2, "cdma2000 Wireless IP Network Standard: Simple IP and Mobile IP Access Services," 3GPP2 X.S0011-002-C, Version 1.0.0, Aug. 2003.

Vixie, et al., "Dynamic Updates in the Domain Name System (DNS Update)," Network Working Group, Request for Comments: 2136, Apr. 1997.

Williamson, et al., "Referral Whois (RWhois) Protocol V1.5," Network Working Group, Request for Comments: 2167, Jun. 1997.

Rigney, et al., "Remote Authentication Dial in User Service (RADIUS)," Network Working Group, Request for Comments: 2865, Jun. 2000.

Perkins, "IP Mobility Support for 1Pv4," Network Working Group, Request for Comments: 3344, Aug. 2002.

Johnson, et al., "Mobility Support in 1Pv6," Network Working Group, Request for Comments: 3775, Jun. 2004.

Aboba, et al., "The Network Access Identifier," Network Working Group, Request for Comments: 4282, Dec. 2005.

* cited by examiner

_(pg. 159)_

USER CONTROL OVER WIFI NETWORK ACCESS

TECHNICAL BACKGROUND

Wireless Fidelity (WiFi) is a popular wireless protocol to obtain network access—often to the Internet. Typically, a WiFi access point broadcasts a Service Set Identification (SSID) that is detected by user devices. The user devices typically respond to the SSID with an access code that is pre-stored in the WiFi access point. The WiFi access point provides network access if the user-provided access code matches the pre-stored access code. The user typically manages multiple access codes for the various WiFi access points that they use. Unfortunately, these WiFi access points are not used to provide effective and efficient user control over WiFi network access.

Other wireless networks also include user authorization systems that control network access. For example, 3G networks may have an Authentication, Authorization, and Accounting (AAA) system, and 4G networks may have a Home Subscriber Server (HSS). These other wireless networks also provide network access to user devices. Unfortunately, the other wireless networks are not used to provide effective and efficient user control over WiFi network access.

In particular, WiFi access points and these other wireless networks are not effectively used in an integrated manner to provide efficient user control over WiFi network access.

TECHNICAL OVERVIEW

A server system transfers display data for presentation to a user who selects multiple geographically-distributed WiFi access systems and a password. The server system receives user data that indicates the user-selected WiFi network access systems and the user-selected password. The server system stores an association between the user-selected WiFi network access systems and the user-selected password. The server system receives an access request for one of the user-selected WiFi network access systems using the user-selected password. The server system transfers a positive response to the access request based on the stored association between the user-selected WiFi network access systems and the user-selected password.

DETAILED DESCRIPTION

Figure 1:
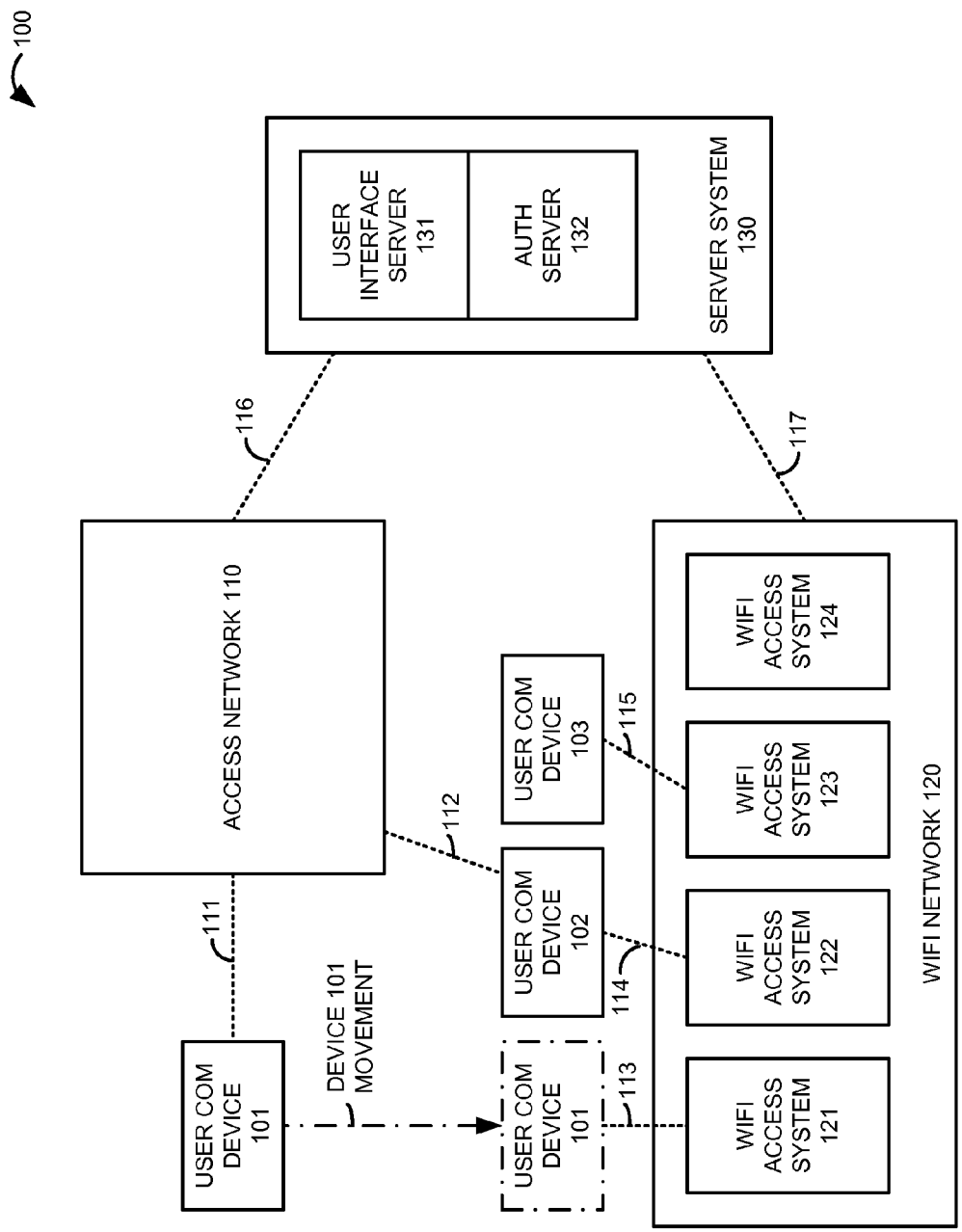
FIG. 1 illustrates a communication system to provide user control over access to a WiFi network having geographically-distributed WiFi access systems.

FIG. 1 illustrates communication system 100 to provide user control over access to WiFi network 120 having geographically-distributed WiFi access systems 121-124. Communication system 100 comprises user communication devices 101-103, access network 110, WiFi network 120, and server system 130. Server system 130 comprises user interface server 131 and authorization server 132.

User communication devices 101-103 comprise phones, computers, media players, machine transceivers, or some other WiFi communication equipment. User communication devices 101-102 and access network 110 communicate over respective access links 111-112. User communication devices 101-103 and WiFi access systems 121-123 communicate over respective WiFi links 113-115. Access network 110 and WiFi network 120 communicate with server system 130 over respective network links 116-117.

In operation, user interface server 131 transfers display data to user communication device 101 over access network 110 and links 111 and 116 for presentation to a user. In response to the display data, the user selects WiFi access systems 121-123 but not access system 124. The user also selects a single password for the user-selected WiFi access systems 121-123. In some examples, the display data renders geographic maps that indicate WiFi access systems 121-124 for selection. The display data may also include a data collection module to collect the password from the user.

User communication device 101 transfers user data for delivery to user interface server 131. The user data indicates the user-selected WiFi network access systems 121-123, the user-selected password, and possibly other user selections and data. User interface server 131 receives and transfers the user data to user authorization server 132.

Authorization server 132 stores an association between the user-selected WiFi network access systems 121-123 and the user-selected password. Subsequently, user communication device 101 moves near WiFi access system 121 and transfers an access request to WiFi access system 121 using the user-selected password. WiFi access system 121 transfers the access request for delivery to authorization server 132.

Authorization server 132 receives the access request for access to user-selected WiFi network access system 121 using the user-selected password. Based on the stored association between the user-selected WiFi network access system 121 and the user-selected password, authorization server 132 transfers a positive response for delivery to WiFi network access system 121. WiFi network access system 121 then provides WiFi access (typically to the Internet) to wireless communication device 101 over WiFi link 113.

User wireless communication device 102 could select and use multiple WiFi access systems with a single password in a similar manner. In some examples, wireless communication device 101 is used to select the WiFi access systems and password, while communication device 102 and/or communication device 103 are used to access the selected WiFi access systems with the password. Also note that a user may have different passwords for different groups of access systems, devices, timeframes, and the like. If desired, the user may also use a given password for only one access system. Note that a password could be any sequence of letters, numbers, symbols, or other data.

In some examples, additional items are selected by the user responsive to the display data. These additional items may be indicated in the user data, stored in the association, and used in combination to transfer the positive response to the access request. For example, the user may specify a user name to use when accessing their selected WiFi network access systems. In other examples, the user specifies a communication device to use when accessing their selected WiFi network access systems. In yet other examples, the user specifies a timeframe for access to their selected WiFi network access systems.

In some examples, user interface server 131 transfers configuration data for delivery to user communication device 101 and/or user communication device 102 over access network 110. The configuration data associates broadcast identification signals for the user-selected WiFi network access systems with the user-selected password. User communication devices 101-102 use the configuration data to obtain the password from the user and to transfer the access request when in range of one of the selected WiFi network access systems.

In some examples, the configuration data includes an access key that is correlated to the broadcast identification signals for the user-selected WiFi network access systems and with the user-selected password. The access key is stored in authorization server 132 in association with the user-selected WiFi network access systems. User communication device 101 would provide the access key in their access request when in range of one of the selected WiFi network access systems and if the password is provided by the user. Authorization server 132 could then return a positive response based on its own stored access key.

In some examples, the configuration data indicates a dynamically-changing network key, such as time-of-day, that is correlated to the broadcast identification signals for the user-selected WiFi network access systems and with the user-selected password. When in range of one of the selected WiFi network access systems and if the password is provided by the user, user communication device 101 uses the dynamically-changing network key to generate a hash value for their access request. In response to the access request, authorization server 132 could generate its own hash value based on the dynamically-changing network key for comparison to the hash value from the access request. If the comparison indicates the relationship, then authorization server 132 returns the positive response for WiFi access. For example, if the dynamically-changing network key is time-of-day, then both hash values should correlate if calculated within the same timeframe.

Access network 110 comprises computer and communications equipment that use Wireless Fidelity (WiFi), Long Term Evolution (LTE), Global System for Mobile Communications (GSM), Evolution Data Only (EVDO), Bluetooth, DOCSYS, T1, Ethernet, Internet Protocol (IP), or some other communication protocols—including combinations thereof. Server system 130 comprises computer equipment and software that may be implemented in a single platform or may be distributed across multiple platforms. Communication links 111-112 and 116-117 might be wireless, optical, metallic, or some other communication media—including combinations thereof. Communication links 111-112 and 116-117 may individually comprise multiple parallel connections that utilize different protocols and paths. Communication links 111-112 and 116-117 may also include various intermediate networks, systems, and devices.

Figure 2:
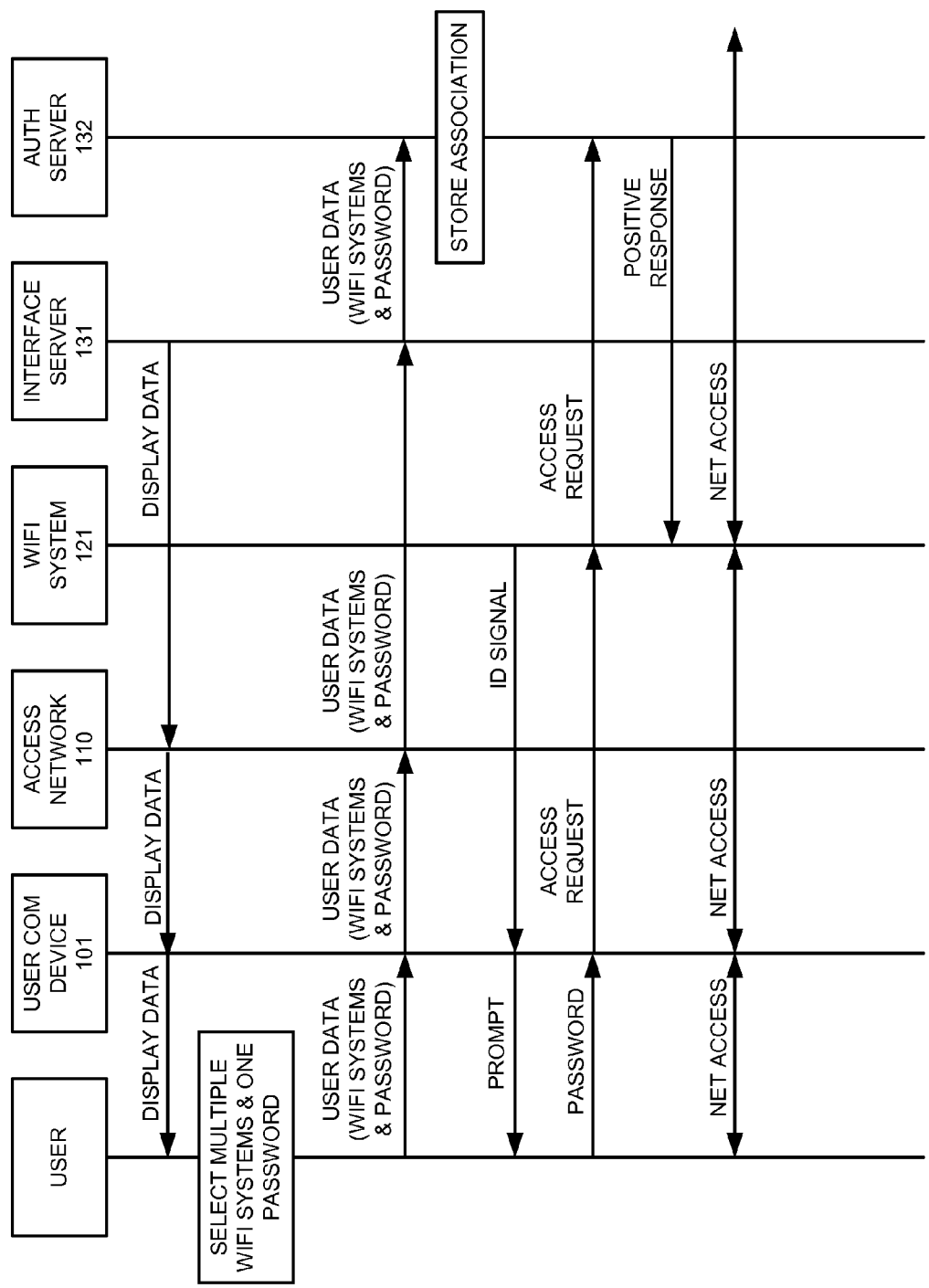
FIG. 2 illustrates the operation of a communication system to provide user control over access to a WiFi network having geographically-distributed WiFi access systems.

FIG. 2 illustrates the operation of communication system 100 to provide user control over access to WiFi network 120. User interface server 131 transfers display data to user communication device 101 over access network 110, and user communication device 101 graphically presents the resulting display data to the user. For example, user communication device might present the display data in the form of geographic maps that indicate WiFi access systems 121-124 for selection. In response to the display data, the user selects WiFi access systems 121-123. The user also specifies a password for user-selected WiFi access systems 121-123.

User communication device 101 transfers user data over access network 110 to user interface server 131. The user data indicates user-selected WiFi network access systems 121-123, the user-selected password, and possibly other user selections and data. User interface server 131 transfers the user data to user authorization server 132. Authorization server 132 stores an association between the user-selected WiFi network access systems 121-123 and the user-selected password—and typically other pertinent data. Various techniques to store this association are described herein.

WiFi access system 121 transmits a wireless identification signal for reception by in-range devices, such as an SSID signal, pilot signal, and the like. Subsequently, user communication device 101 detects the identification signal from WiFi access system 121 and prompts the user for a password. The user provides their selected password to user communication device 101, and device 101 transfers an access request to WiFi access system 121 using the user-selected password. Various techniques to use the password are described herein. WiFi access system 121 transfers the access request to authorization server 132.

Authorization server 132 processes the access request and the stored association between user-selected WiFi network access system 121 and user-selected password to determine that the request should be granted. Authorization server 132 then transfers a positive response to WiFi network access system 121. Based on the positive response, WiFi network access system 121 provides wireless communication device 101 and the user with WiFi network access to some other data system, such as the Internet (not shown).

Figure 3:
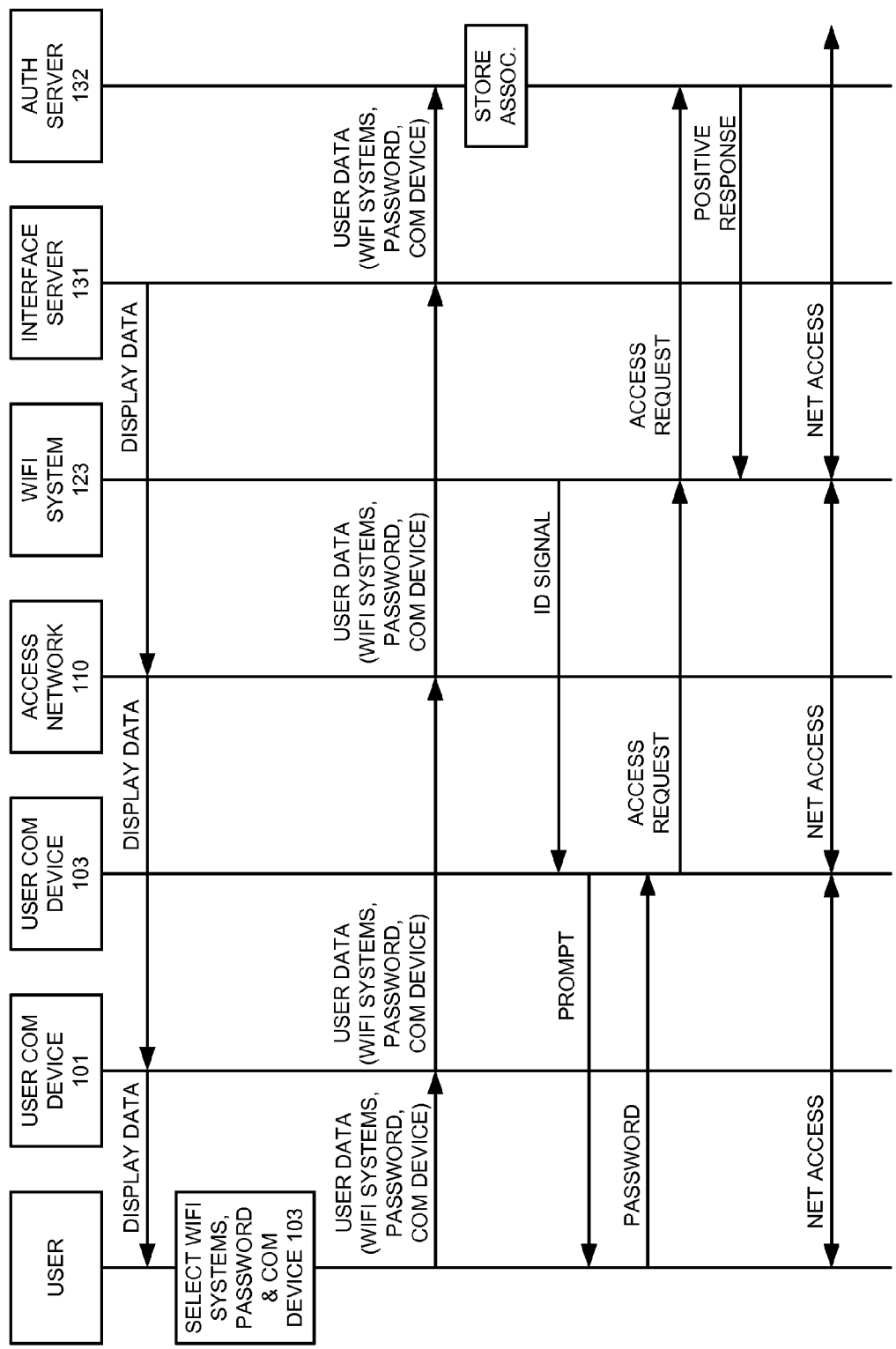
FIG. 3 illustrates the operation of a communication system to provide user control over access to a WiFi network having geographically-distributed WiFi access systems by allowing user-selection of communication devices.

FIG. 3 illustrates the operation of communication system 100 to provide user control over access to WiFi network 120 by allowing user-selection of communication devices. User interface server 131 transfers display data to user communication device 101 over access network 110, and user communication device 101 graphically presents the resulting display data to the user. In response to the display data, the user selects WiFi access systems 121-123 and a password. In this example, the user also selects communication device 103 to access user-selected WiFi access systems 121-123. The user may specify communication device 103 by name, address, number, and the like. User interface server 131 may also identify communication device 103 in the display data for selection by the user.

User communication device 101 transfers user data over access network 110 to user interface server 131. The user data indicates user-selected WiFi network access systems 121-123, user-selected communication device 103, the user-selected password, and possibly other information. User interface server 131 transfers the user data to user authorization server 132. Authorization server 132 stores an association between the user-selected WiFi network access systems 121-123, user-selected communication device 103, the user-selected password, and other data. Various techniques to store this association are described herein.

WiFi access system 123 transmits its wireless identification signal. User communication device 103 detects the identification signal from WiFi access system 123 and prompts the user for a password. The user provides their selected password to user communication device 103, and device 103 transfers an access request to WiFi access system 123 using the user-selected password. Various techniques to use the password are described herein.

WiFi access system 123 transfers the access request to authorization server 132. Authorization server 132 processes the access request and the stored association between user-selected WiFi network access system 123, user-selected communication device 103, and the user-selected password to determine that the request should be granted. Authorization server 132 then transfers a positive response to WiFi network access system 123. Based on the positive response, WiFi network access system 123 provides user communication device 103 with WiFi network access to another data system, such as the Internet (not shown). Note that other items could be also selected by the user and used for authorization, such as timeframes, security formats, and the like.

Figure 4:
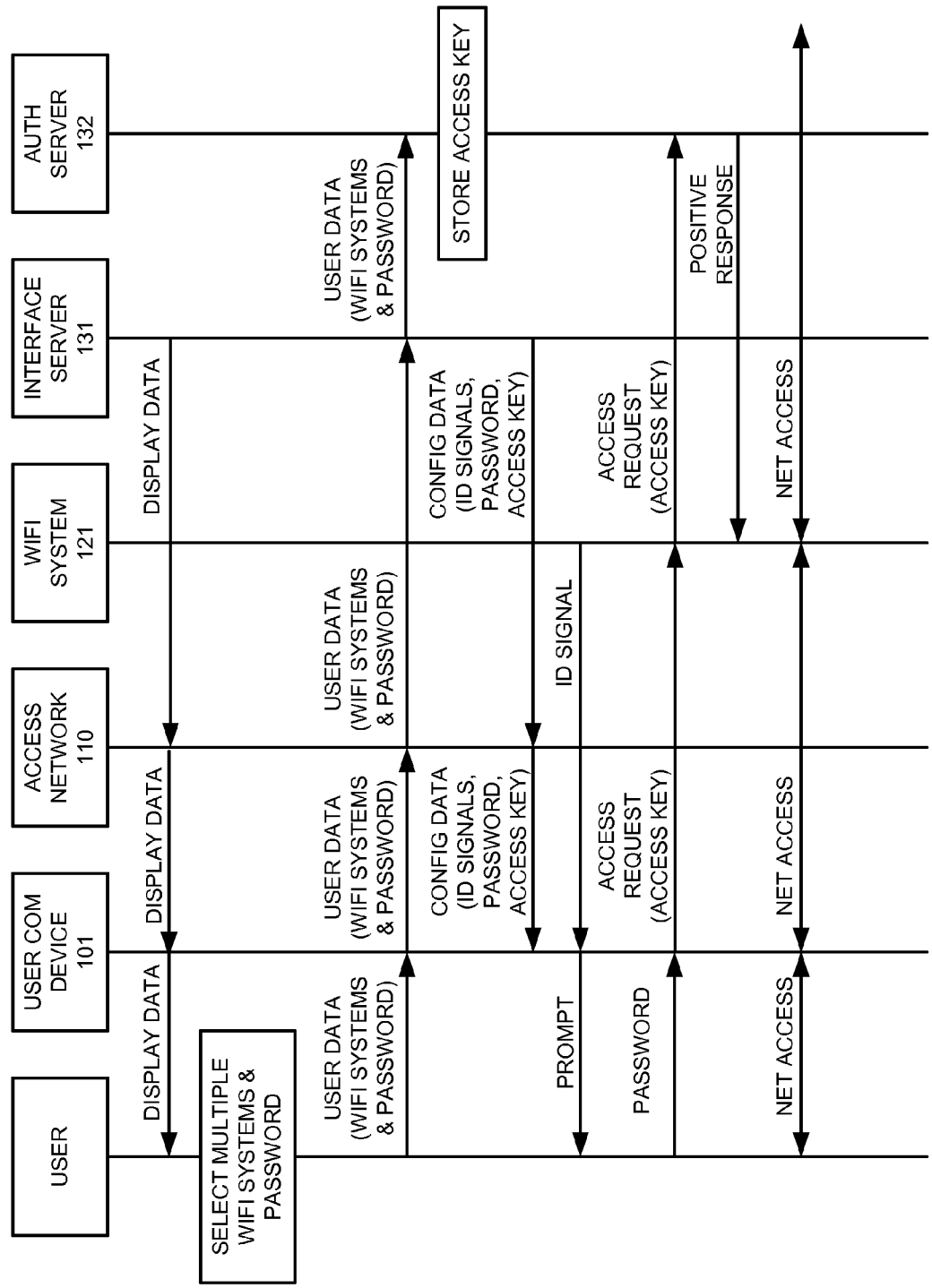
FIG. 4 illustrates the operation of a communication system to provide user control over access to a WiFi network having geographically-distributed WiFi access systems by transferring configuration data to a user communication device.

FIG. 4 illustrates the operation of communication system 100 to provide user control over access to WiFi network 120 by transferring configuration data to user communication device 101. User interface server 131 transfers display data to user communication device 101 over access network 110, and user communication device 101 graphically presents the resulting display data to the user. In response to the display data, the user selects WiFi access systems 121-123 and a password.

User communication device 101 transfers user data over access network 110 to user interface server 131. The user data indicates user-selected WiFi network access systems 121-123, the user-selected password, and possibly other user selections and data. User interface server 131 transfers the user data to user authorization server 132. Authorization server 132 stores an association between the user-selected WiFi network access systems 121-123 and one or more access keys for systems 121-123. The stored association may also indicate the user-selected password and other pertinent data.

Responsive to the user-selections, user interface server 131 transfers configuration data over access network 110 to user communication device 101. The configuration data indicates identification signals (SSIDs and the like) for user-selected WiFi network access systems 121-123. The configuration data also indicates the password, the access key, and perhaps other data. Note that user interface server 131 may also transfer the configuration data to other user-selected communication devices.

User-selected WiFi access system 121 transmits its wireless identification signal, and eventually, user communication device 101 detects this identification signal from WiFi access system 121. Based on the configuration data and the ID signal, user communication device 101 prompts the user for a password. The user provides their selected password to user communication device 101, and device 101 transfers an access request to WiFi access system 121 using the user-selected password. In this example, user communication device 101 uses the password for verification, and if the user-supplied password matches the password from the configuration data, then device 101 transfers the access key to user-selected WiFi access system 121.

WiFi access system 121 transfers the access request including the access key to authorization server 132. Authorization server 132 processes the access request and the stored association between user-selected WiFi network access system 121 and user-supplied access key to determine that the request should be granted. Authorization server 132 then transfers a positive response to WiFi network access system 121. Based on the positive response, WiFi network access system 121 provides user communication device 101 and the user with WiFi network access to some other data system, such as the Internet (not shown).

Figure 5:
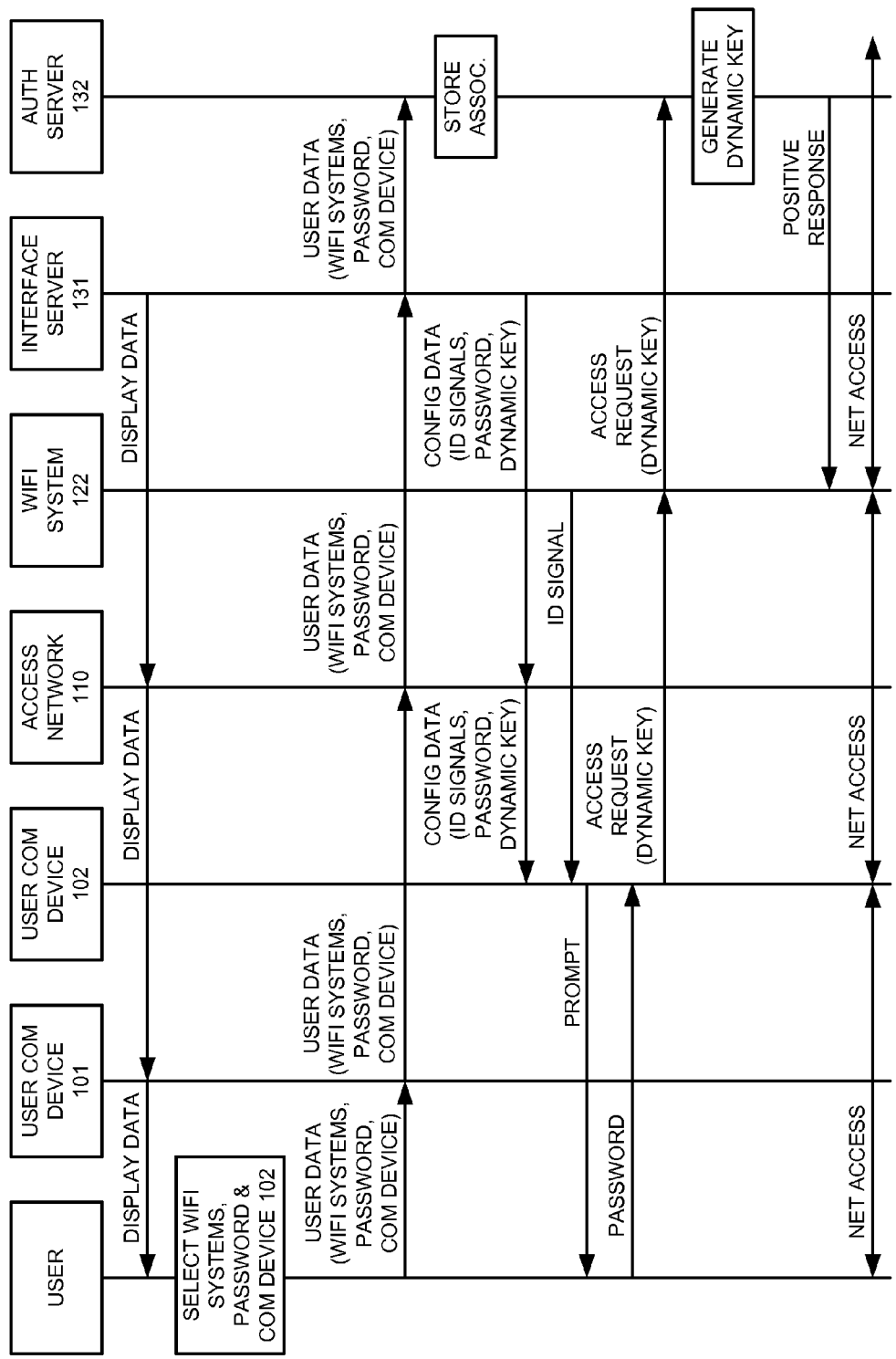
FIG. 5 illustrates the operation of a communication system to provide user control over access to a WiFi network having geographically-distributed WiFi access systems by using dynamic access keys.

FIG. 5 illustrates the operation of communication system 100 to provide user control over access to WiFi network 120 by using dynamic access keys. User interface server 131 transfers display data to user communication device 101 over access network 110, and user communication device 101 graphically presents the resulting display data to the user. In response to the display data, the user selects WiFi access systems 121-123, a password, and user communication device 102.

User communication device 101 transfers user data over access network 110 to user interface server 131. The user data indicates user-selected WiFi network access systems 121-123, user communication device 102, the user-selected password, and possibly other data. User interface server 131 transfers the user data to user authorization server 132. Authorization server 132 stores an association between the user-selected WiFi network access systems 121-123 and a secret code used to generate the dynamic key. The stored association may also indicate the user-selected password and other pertinent data.

Responsive to the user-selections, user interface server 131 transfers configuration data over access network 110 to user communication device 102. The configuration data indicates identification signals for user-selected WiFi network access systems 121-123. The configuration data also indicates the password, secret code, dynamic key instructions, and perhaps other data. Note that user interface server 131 may also transfer the configuration data to other user-selected communication devices.

User-selected WiFi access system 122 transmits its wireless identification signal, and eventually, user communication device 102 detects this identification signal from WiFi access system 122. Based on the configuration data and the ID signal, user communication device 102 prompts the user for a password. The user provides their selected password to user communication device 102, and device 102 transfers an access request to WiFi access system 122 using the user-selected password.

In this example, user communication device 102 uses the password for verification, and if the user-supplied password matches the password from the configuration data, then device 102 generates and transfers a dynamic access key to user-selected WiFi access system 122. In this example, the dynamic key is a mathematical hash between the secret code from the configuration data and dynamically changing network data. For example, the secret code could be mathematically combined with the current time-of-day to generate the dynamic access key.

WiFi access system 122 transfers the access request including the dynamic access key to authorization server 132. Authorization server 132 processes the access request and the stored association (the secret code) to generate the dynamic access key in a similar manner to device 102. If the two dynamic access keys correlate, then the access request should be granted. Note that the correlation may not require a strict match. For example, if time of day is used for the dynamic key, then two keys generated around the same time would have a detectable mathematical relationship and would correlate. Various other dynamic key techniques could be used in a similar manner.

Authorization server 132 then transfers a positive response to WiFi network access system 122. Based on the positive response, WiFi network access system 122 provides user communication device 102 and the user with WiFi network access to some other data system, such as the Internet (not shown).

Figure 6:
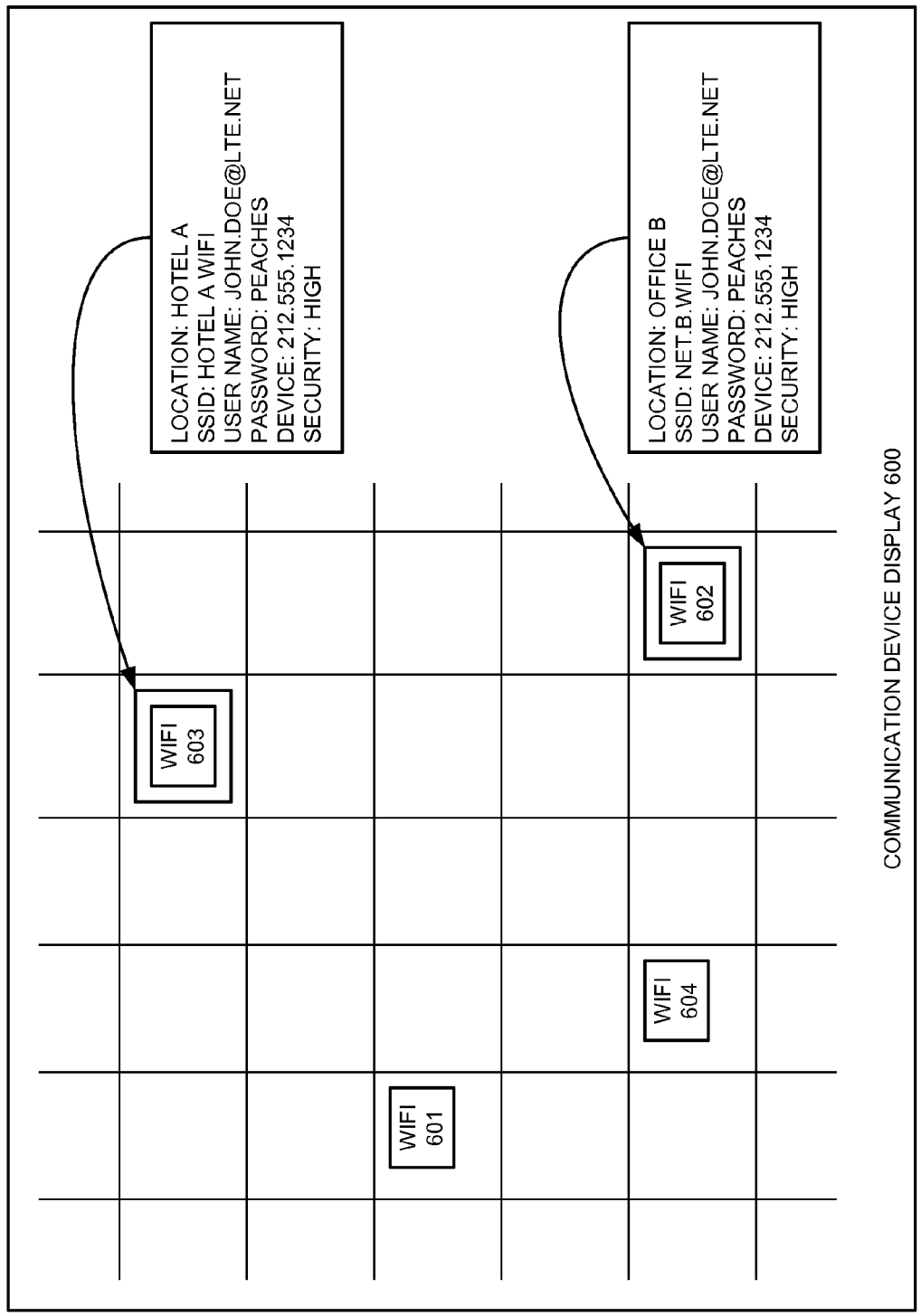
FIG. 6 illustrates a communication device display that renders a geographic map for a user to select WiFi network access systems and specify passwords.

FIG. 6 illustrates communication device display 600 that renders a geographic map for a user to select WiFi network access systems 601-604 and specify passwords. For clarity, the geographic map is depicted by a simple grid on FIG. 6. Note that navigation controls would be provided on the map, but they are not depicted for clarity. In this example, the user has selected WiFi access systems 602-603 as indicated by the frame around systems 602-603. Text boxes are associated with the selected WiFi access systems 602-603 and provide a mechanism for the user to specify passwords, user names, user devices, security settings, and the like. The text boxes also provide access system information, such as SSIDs, location, and possibly other data.

Figure 7:
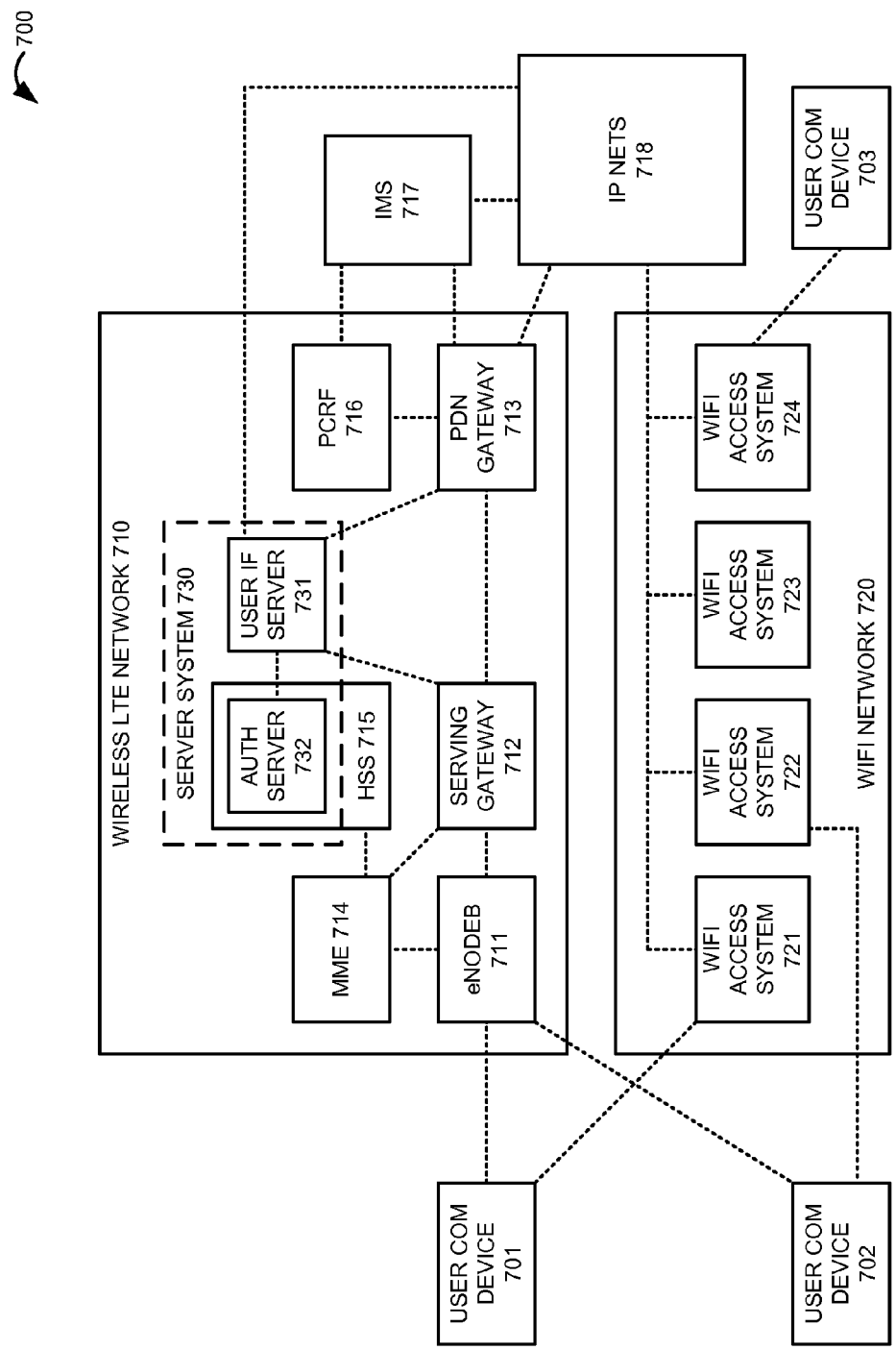
FIG. 7 illustrates a wireless Long Term Evolution (LTE) network to provide user control over access to a WiFi network having geographically-distributed WiFi access systems.

FIG. 7 illustrates LTE/WiFi communication system 700 to provide user control over access to WiFi network 720 having geographically-distributed WiFi access systems 721-724. LTE/WiFi communication system 700 comprises user communication devices 701-703, wireless LTE network 710, WiFi network 720, IP Multimedia Subsystem (IMS) 717, and IP networks 718. Wireless LTE network 710 includes eNodeB 711, serving gateway 712, Packet Data Network (PDN) gateway 713, Mobility Management Entity (MME) 714, Home Subscriber Server (HSS) 715, and Policy Charging and Rules Function (PCRF) 716.

Wireless LTE network 710 also includes server system 730 that comprises user interface server 731 and authorization server 732. User interface server 731 and authorization server 732 operate like servers 131-132 described above. Note that the authorization server 732 is hosted by or integrated within HSS 715. In a like manner, wireless LTE network 710 operates like access network 110 described above. Thus, wireless LTE network 710 transfers the display data, receives user-selections, transfers configuration data, and provides WiFi authorization as described above.

For example, the user may operate one of communication devices 701-703 to access user interface server 731 and select WiFi access systems 721-722 and 724, a user name, a password, user devices 701-703, timeframes, and the like. When one of the selected user communication devices 701-703 is proximate to one of the selected WiFi access systems 721-722 and 724, then the user device will interact with the proximate WiFi access system as described above. The proximate WiFi access system will transfer access requests to authorization server 732 in HSS 715—typically through various proxies and interfaces. Authorization server 732 in HSS 715 transfers positive responses as described above.

Figure 8:
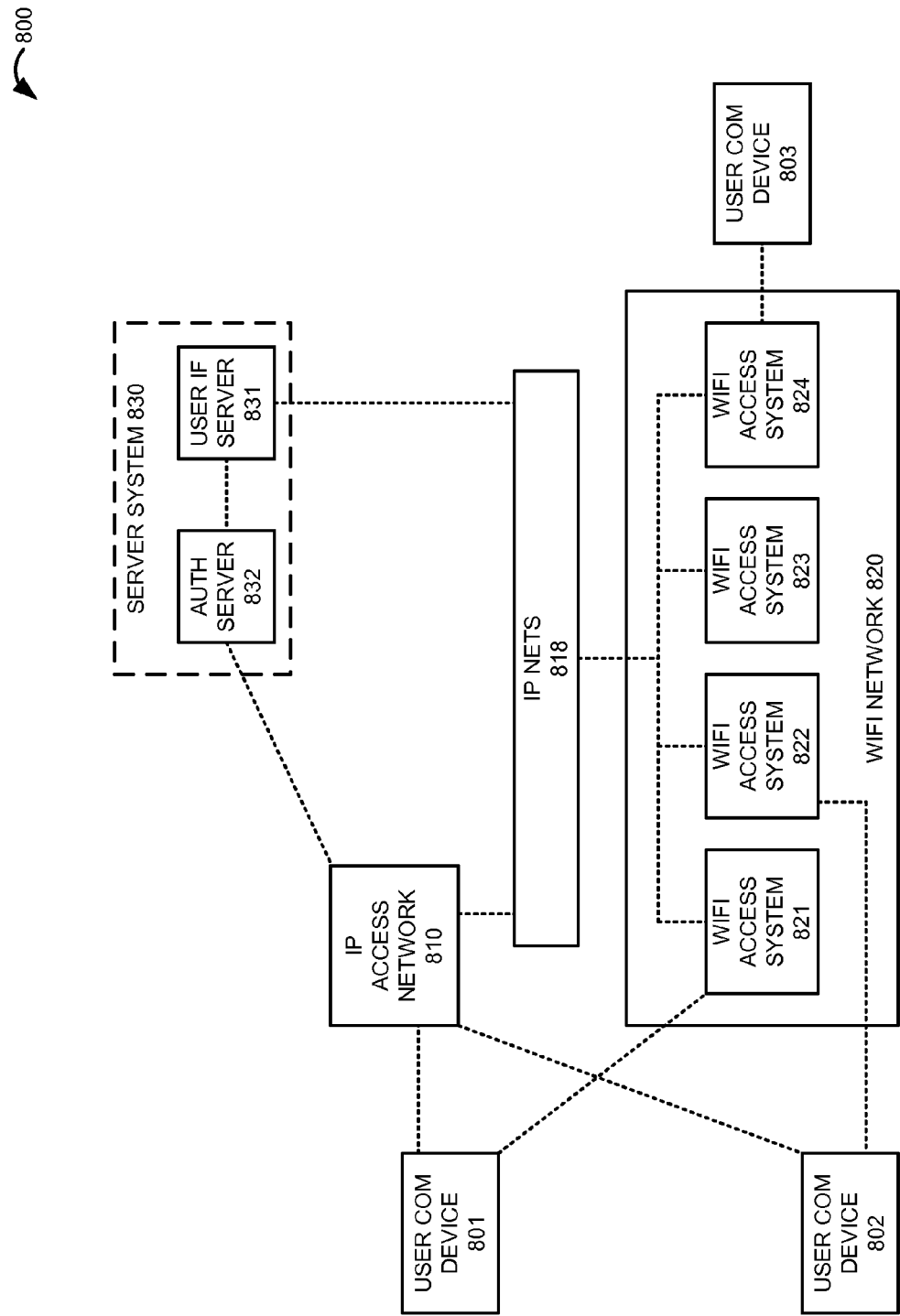
FIG. 8 illustrates an WiFi system to provide user control over access to a WiFi network having geographically-distributed WiFi access systems.

FIG. 8 illustrates WiFi communication system 800 to provide user control over access to WiFi network 820 having geographically-distributed WiFi access systems 821-824. WiFi communication system 800 comprises user communication devices 801-803, IP access network 810, IP networks 818, and server system 830. Server system 830 resides in the core of a nationwide wireless communication network.

Server system 830 comprises user interface server 831 and authorization server 832. User interface server 831 and authorization server 832 and operate like servers 131-132 described above. Thus, server system 830 transfers the display data, receives user-selections, transfers configuration data, and provides WiFi authorization as described above.

For example, the user may operate one of communication devices 801-803 to access user interface server 831 and select WiFi access systems 821-822 and 824, a user name, a password, user devices 801-803, timeframes, and the like. When one of the selected user communication devices 801-803 is proximate to one of the selected WiFi access systems 821-822 and 824, then the user device will interact with the proximate WiFi access system as described above. The proximate WiFi access system will transfer access requests to authorization server 832. Authorization server 832 transfers positive responses as described above.

In other examples, portions of the server systems described herein could be integrated into the authorization systems of other networks. For example, the AAA system in a 2G or 3G network could host the user interface server and/or the authorization servers described herein.

Figure 9:
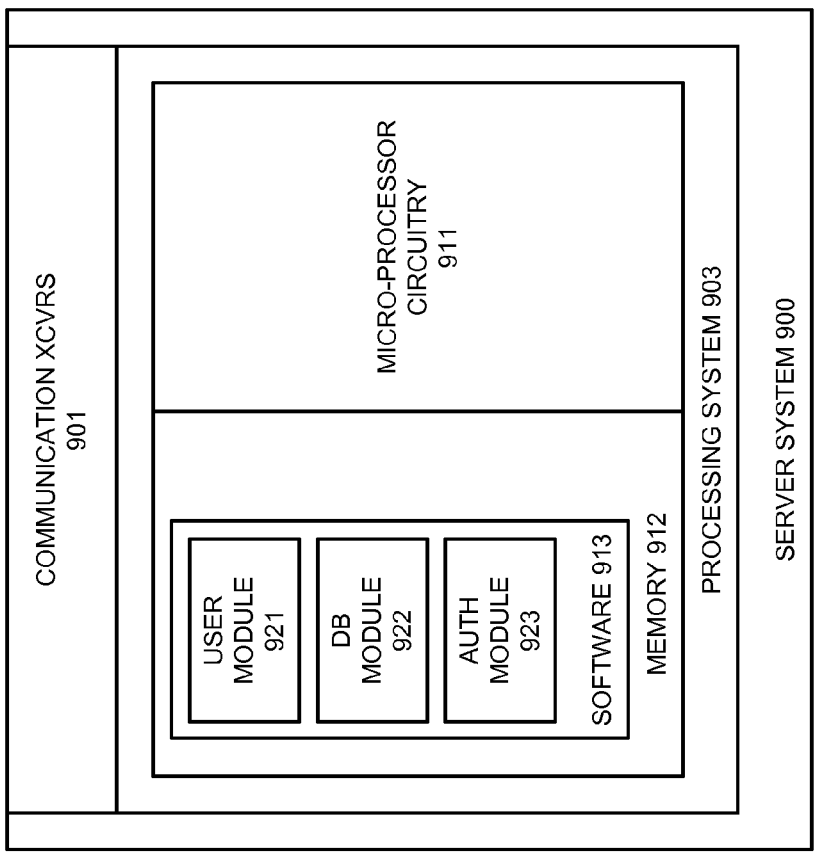
FIG. 9 illustrates a server system to provide user control over access to WiFi networks.

FIG. 9 illustrates server system 900 to provide user control over access to WiFi networks. Server system 900 is an example of the server system 130, although system 130 may use alternative configurations and operations. Server system 900 comprises communication transceivers 901 and processing system 903. Processing system 903 comprises micro-processing circuitry 911 and memory 912. Memory 912 stores software 913. Server system 900 may be integrated into a single platform or may be distributed across multiple diverse computer and communication systems. Some conventional aspects of server system 900 are omitted for clarity, such as power supplies, enclosures, and the like.

Communication transceivers 901 comprise communication components, such as ports, circuitry, memory, software, and the like. Communication transceivers 901 typically utilize Ethernet, Internet, or some other networking protocol—including combinations thereof.

Micro-processor circuitry 911 comprises circuit boards that hold integrated circuitry and associated electronics. Memory 912 comprises non-transitory, computer-readable, data storage media, such as flash drives, disc drives, and the like. Software 913 comprises computer-readable instructions that control the operation of micro-processor circuitry 911 when executed. Software 913 includes modules 921-923 and may also include operating systems, applications, utilities, databases, and the like. Micro-processor circuitry 911 and memory 912 may be integrated into a single computer system or may be distributed across multiple computer systems.

When executed by circuitry 911, user module 921 directs circuitry 911 to interact with user devices to enable the user to select access systems, passwords, and the like. User module 921 also directs circuitry 911 to transfer configuration data in some examples. When executed by circuitry 911, database module 922 directs circuitry 911 to stores the associations as described above. When executed by circuitry 911, authorization module 923 directs circuitry 911 to provide positive or negative responses to WiFi access requests based on the stored associations.

Figure 10:
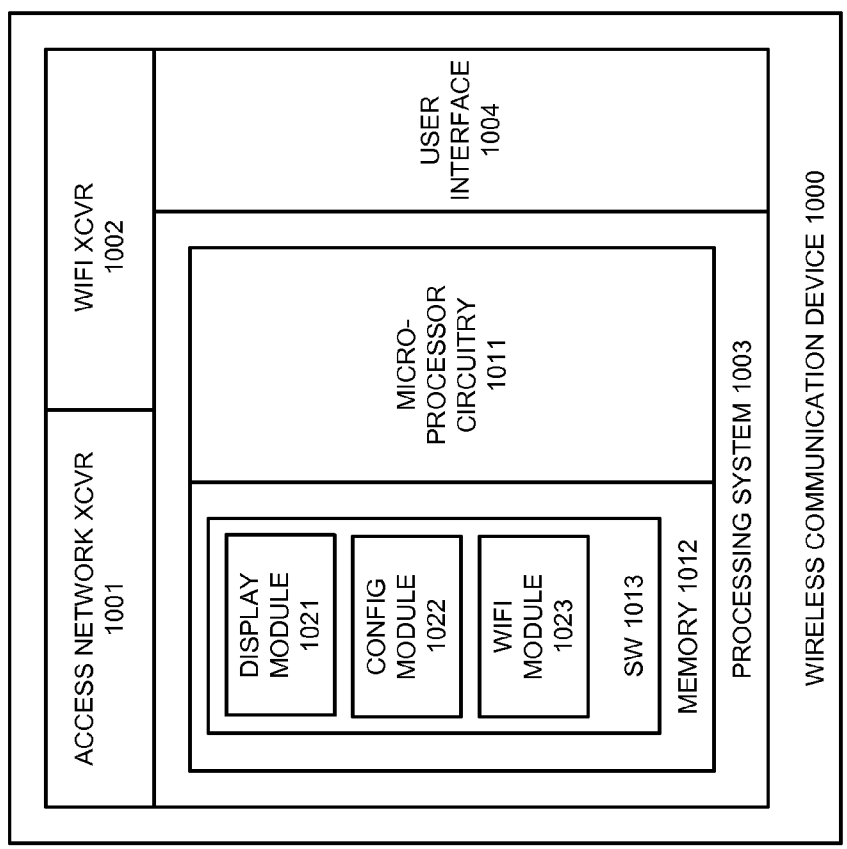
FIG. 10 illustrates wireless communication device to provide user control over access to WiFi networks.

FIG. 10 illustrates wireless communication device 1000 to provide user control over access to WiFi networks. Wireless communication device 1000 is an example of user communication devices 101-103, although devices 101-103 may use alternative configurations and operations. Wireless communication device 1000 comprises access network transceiver 1001, network transceiver 1002, processing system 1003, and user interface 1004. Processing system 1003 comprises micro-processing circuitry 1011 and memory 1012. Memory 1012 stores software 1013. Some conventional aspects of wireless communication device 1000 are omitted for clarity, such as power supplies, enclosures, and the like. Wireless communication device 1000 may be integrated into other systems or devices.

Access network transceiver 1001 and WiFi transceiver 1002 each comprise communication components, such as circuitry, memory, software, antennas, amplifiers, filters, modulators, signal processors, and the like. In some examples, the radio communications include multiple transceiver sub-systems for near-field, local network, and wide-area network data communications. Access network transceiver 1001 exchanges user data and configuration data as described above. WiFi network transceiver 1002 detects WiFi identification signals, transfers WiFi access requests, and provides WiFi network access.

User interface 1004 includes components to interact with a human operator, such as a touch display, speaker, microphone, camera, buttons, and switches. User interface 1004 displays maps, text boxes, user prompts and the like. Typically a touch display in user interface 1004 receives the user instructions that trigger the actions described herein.

Micro-processor circuitry 1011 comprises one or more circuit boards that hold integrated circuit chips and associated electronics. Memory 1012 comprises non-transitory data storage media, such as flash drives, disc drives, and the like. Software 1013 comprises computer-readable instructions that control the operation of micro-processor circuitry 1011 when executed. Software 1013 includes modules 1021-1023 and may also include additional operating systems, applications, utilities, databases, and the like.

When executed by circuitry 1011, display module 1021 directs circuitry 1011 to display maps, text boxes, and the like to receive user selections. When executed by circuitry 1011, configuration module 1022 direct circuitry 1011 to receive and store configuration data as described herein. When executed by circuitry 1011, WiFi module 1023 directs circuitry 1011 to prompt for passwords and transfer access requests as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a server system to control access to a Wireless Fidelity (WiFi) network that comprises a plurality of geographically-distributed WiFi access systems;
    transferring display data from the server system for presentation to a user who selects more than one of the geographically-distributed WiFi access systems, two or more communication devices and a single password for the multiple communication devices to access the multiple user-selected WiFi access systems;
    receiving user data into the server system that indicates the user-selected WiFi network access systems and the user-selected communication devices and the single user-selected password and storing an association between the user-selected WiFi network access systems the user-selected communication devices and the single user-selected password;
    receiving an access request into the server system for access to one of the user-selected WiFi network access systems using the single user-selected password, wherein the access request indicates one of the user-selected communication devices; and
    transferring a positive response to the access request from the server system based on the stored association between the user-selected WiFi network access systems, the user-selected communication devices, and the single user-selected password.

2. The method of claim 1 wherein the display data renders geographic map displays that indicate the WiFi network access systems.

3. The method of claim 1 wherein:
    the user selects a user name for the user-selected WiFi access systems responsive to the display data;
    receiving the user data comprises receiving the user-selected user name;
    storing the association comprises storing the association between the user-selected WiFi network access systems the user-selected communication devices and the single user-selected password and the user-selected user name;
    receiving the access request comprises receiving the access request that indicates the user-selected user name; and
    transferring the positive response based on the stored association comprises transferring the positive response based on the stored association between the user-selected WiFi network access systems the user-selected communication devices and and the user-selected password and the user-selected user name.

4. The method of claim 1 further comprising processing the user data to transfer configuration data for delivery to the one user-selected communication device indicated in the access request, wherein the configuration data associates broadcast identification signals for the user-selected WiFi network access systems with the user-selected password.

5. The method of claim 1 further comprising:
    processing the user data to transfer configuration data for delivery to the one user-selected communication device indicated in the access request, wherein the configuration data associates broadcast identification signals for the user-selected WiFi network access systems with the user-selected password and an access key, wherein the one user-selected communication device indicated in the access request detects one of the broadcast identification signals, receives the user-selected password from the user, and processes the user-selected password to transfer the access key; and
    wherein receiving the access request using the user-selected password comprises receiving the access request indicating the access key.

6. The method of claim 5 wherein:
    storing the association between the user-selected WiFi network access systems and the user-selected communication devices and the user-selected password comprises storing the access key in association with the user-selected WiFi network access systems;
    transferring the positive response based on the stored association comprises transferring the positive response by comparing the access key from the access request and the stored access key.

7. The method of claim 1 further comprising:
    processing the user data to transfer configuration data for delivery to the one user-selected communication device indicated in the access request, wherein the configuration data associates broadcast identification signals for the user-selected WiFi network access systems with the user-selected password and a dynamically-changing network key, wherein the one user-selected communication device indicated in the access request detects one of the broadcast identification signals, receives the user-selected password from the user, and processes the user-selected password and the dynamically-changing network key to transfer a hash value; and wherein receiving the access request using the user-selected password comprises receiving the access request indicating the hash value; and wherein transferring the positive response to the access request comprises processing the hash value with the dynamically-changing network key.

8. The method of claim 7 wherein the dynamically-changing network key comprises time of day.

9. The method of claim 1 wherein the server system comprises a portion of an authorization system for a wireless Long Term Evolution (LTE) network and wherein transferring the display data and receiving the user data comprises communicating over the wireless LTE network.

10. A server system to control access to a Wireless Fidelity (WiFi) network that comprises a plurality of geographically-distributed WiFi access systems, the server system comprising:

a user interface server configured to transfer display data from the server system for presentation to a user who selects more than one of the geographically-distributed WiFi access systems and two or more communication devices and a single password for the multiple communication devices to access the user-selected WiFi access systems responsive to the display data, the user interface server further configured to receive user data into the server system that indicates the user-selected WiFi network access systems and the user-selected communication devices and the user-selected password; and an authorization server operationally coupled to the user interface server and configured to store an association between the user-selected WiFi network access systems and the user-selected communication devices and the single user-selected password, to receive an access request into the server system for access to one of the user-selected WiFi network access systems using the user-selected password, wherein the access request indicates one of the user-selected communication devices, and to transfer a positive response to the access request from the server system based on the stored association between the user-selected WiFi network access systems and the user-selected communication devices and the user-selected password.

11. The server system of claim 10 wherein the user interface server is configured to transfer the display data to render geographic map displays that indicate the WiFi network access systems.

12. The server system of claim 10 wherein:

the user interface server is configured to receive the user data indicating a user name selected by the user for the user-selected WiFi access systems responsive to the display data; and the authorization server is configured to store the association between the user-selected WiFi network access systems and the user-selected communication devices and the user-selected password and the user-selected user name, receive the access request that indicates the user-selected user name, and transfer the positive response based on the stored association between the user-selected WiFi network access systems and the user-selected communication devices and the user-selected password and the user-selected user name.

13. The server system of claim 10 wherein the user interface server is configured to transfer configuration data for delivery to the user-selected communication device indicated in the access request, wherein the configuration data associates broadcast identification signals for the user-selected WiFi network access systems with the user-selected password.

14. The server system of claim 10 wherein:

the user interface server is configured to transfer configuration data for delivery to the user-selected communication device indicated in the access request, wherein the configuration data associates broadcast identification signals for the user-selected WiFi network access systems with the user-selected password and an access key, wherein the user-selected communication device indicated in the access request detects one of the broadcast identification signals, receives the user-selected password from the user, and processes the user-selected password to transfer the access key; and the authorization server is configured to receive the access request using the user-selected password by receiving the access request indicating the access key.

15. The server system of claim 14 wherein the authorization server is configured to store the association between the user-selected WiFi network access systems and the user-selected communication devices and the user-selected password by storing the access key in association with the user-selected WiFi network access systems and to transfer the positive response by comparing the access key from the access request and the stored access key.

16. The server system of claim 10 wherein:

the user interface server is configured to transfer configuration data for delivery to the user-selected communication device indicated in the access request, wherein the configuration data associates broadcast identification signals for the user-selected WiFi network access systems with the user-selected password and a dynamically-changing network key, wherein the user-selected communication device indicated in the access request detects one of the broadcast identification signals, receives the user-selected password from the user, and processes the user-selected password and the dynamically-changing network key to transfer a hash value; and the authorization server is configured to receive the access request using the user-selected password by receiving the access request indicating the hash value and to transfer the positive response by processing the hash value from the access request and the dynamically-changing network key.

17. The server system of claim 16 wherein the dynamically-changing network key comprises time of day.

18. The server system of claim 10 wherein:

the authorization server comprises a portion of an authorization system for a wireless Long Term Evolution (LTE) network; and the user interface server is configured to transfer the display data and receive the user data over the wireless LTE network.

* * * * *